No. 775,272. PATENTED NOV. 15, 1904.
R. S. GRAHAM.
VEHICLE TIRE.
APPLICATION FILED MAR. 24, 1904.
NO MODEL.

WITNESSES:
Fred White
Rene Muine

INVENTOR:
Robert S. Graham,
By Attorneys,
Arthur C. Fraser & Co.

No. 775,272. Patented November 15, 1904.

UNITED STATES PATENT OFFICE.

ROBERT S. GRAHAM, OF NEW YORK, N. Y., ASSIGNOR TO WILLIAM M. PERKINS, OF BROOKLYN, NEW YORK.

VEHICLE-TIRE.

SPECIFICATION forming part of Letters Patent No. 775,272, dated November 15, 1904.

Application filed March 24, 1904. Serial No. 199,719. (No model.)

*To all whom it may concern:*

Be it known that I, ROBERT S. GRAHAM, a citizen of the United States, residing in the borough of Manhattan, city, county, and State of New York, have invented certain new and useful Improvements in Wheel-Tires, of which the following is a specification.

This invention aims to provide a tire which shall have substantially all the resilient qualities of rubber tires, with an increased resistance to wearing of the tread-surface and with consequently a longer life and which shall have certain other improvements referred to in detail hereinafter.

The invention provides also in combination with said tire a rim specially adapted therefor.

My improved tire includes and preferably consists of a continuous band extending around the wheel, which band is formed of a core of resilient material having a longitudinal bore which forms an air-cushion and a space for the inward expansion of material during use, and a covering for this core consisting of ordinary round wire strands wound spirally around the core, which form a durable and at the same time a yielding springy tread-surface.

The accompanying drawings illustrate embodiments of the invention.

Figure 1:
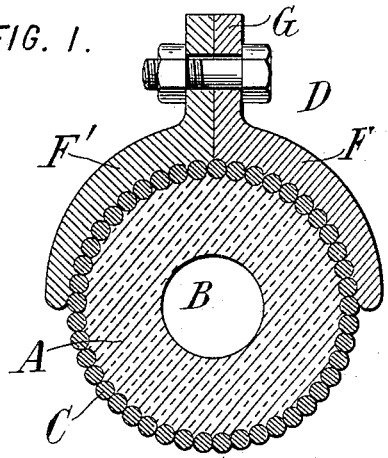
Figure 2:
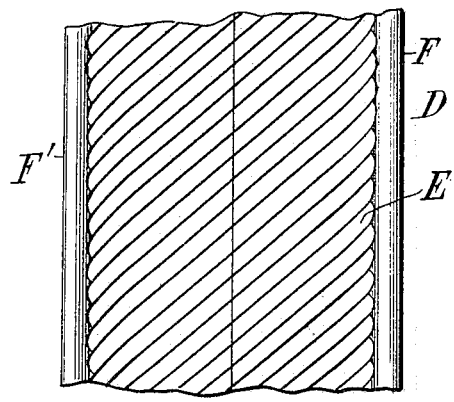
Figure 3:
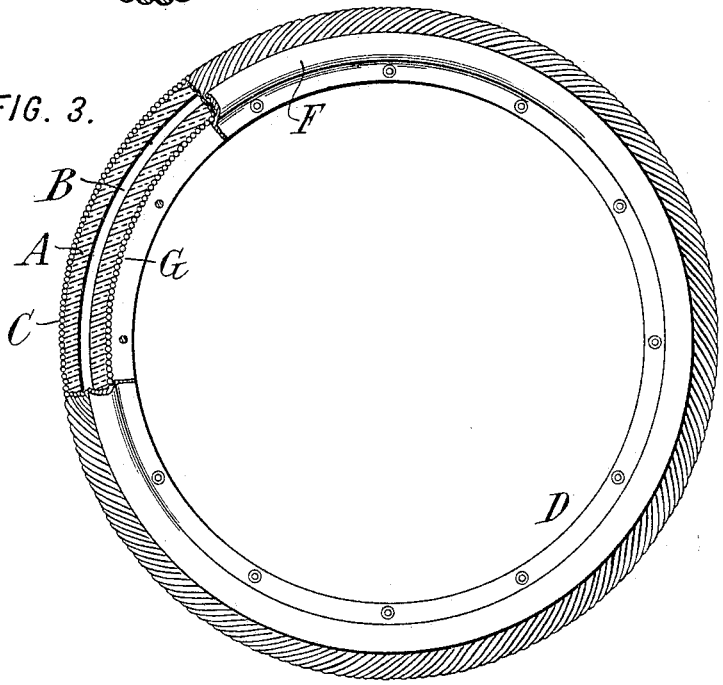
Figure 4:
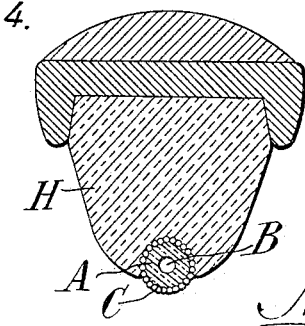

Figure 1 is a transverse section through the tire and a rim specially adapted therefor. Fig. 2 is an edge view of a portion of the rim. Fig. 3 is a longitudinal section of the rim and tire, showing the latter partly in side elevation. Fig. 4 is a transverse section of another form of tire.

Referring now to Figs. 1 to 3, the tire comprises a core A, of rubber or similar resilient material, which is hollow at the center, so as to form a longitudinal bore B of considerable diameter. The core A is wound around with a number of wire strands C, arranged spirally, so that the tire has the external appearance of a wire rope. Each of the several features described contributes to the efficiency of the tire. The wire provides the desired wearing qualities. By reason of its spiral arrangement and the roundness of the individual strands the wires yield individually and locally, giving a localized springy effect very similar to that of rubber. The core A provides a sufficiently resistant and at the same time yielding backing for the springy wire strands to prevent their being bent out of shape. The longitudinal bore B provides an air-cushion of great elasticity and, which is perhaps most important, provides a space within which the rubber may be pressed by the distortion of the wire strands as the wheel rolls over the ground. If it were not for this interior bore, the inward movement of one wire would press the rubber out to a considerable extent between other wires, squeezing it between adjacent wires, and these latter wires would gradually by their movement against each other cut off or wear off small particles of the rubber and soon make the wire covering loose on the core. The provision of a space B within which the rubber may freely expand reduces this objectionable tendency to a minimum. The wire covering also prevents the stretching of the rubber in a circumferential direction, which is a cause of frequent failures in all-rubber tires. The tire is preferably used in combination with a rim D, having a channel formed with spiral grooves E, fitting the spiral wire strands C, and thus holding the tire rigidly against any movement whatever in the rim. The tire is preferably formed as a continuous endless band, and in order to apply it to the rim the latter is preferably formed in two halves F F', having flanges G, bolted or otherwise fastened together at intervals. By this simple construction no special fastening means for the tire are necessary.

In Fig. 4 is shown a tire of ordinary shape H, consisting of rubber or the like, and a band formed similarly to the tire of Fig. 1 is used as a tread, being embedded in the outer face of the tire proper.

Though I have described with great particularity of detail certain embodiments of the invention, yet it is not to be understood that the invention is limited to the details described. Various modifications thereof in detail and in the arrangement and combination of the parts may be made by those skilled in the art without departure from the invention.

What I claim is—

1. A tire including a band comprising a core of resilient material having a longitudinal bore forming an air-cushion and a space for the inward expansion of the material when subjected to pressure, and an outer covering of round wire strands wound spirally around said core.

2. A tire consisting of a core of resilient material having a longitudinal bore forming an air-cushion and a space for the inward expansion of the material when subjected to pressure, and an outer covering of round wire strands wound spirally around said core.

3. A tire consisting of a core A of resilient material having a longitudinal bore B forming an air-cushion and a space for the inward expansion of the material when subjected to pressure, and an outer covering of round wire strands C wound spirally around said core, in combination with a rim D having a spirally-grooved channel fitting the strands of said tire to prevent movement of the latter on the rim.

In witness whereof I have hereunto signed my name in the presence of two subscribing witnesses.

ROBERT S. GRAHAM.

Witnesses:
DOMINGO A. USINA,
THEODORE T. SNELL.